Feb. 14, 1933.　　　　G. A. MILLAR　　　　1,897,487
METHOD AND APPARATUS FOR WORKING FUSED SILICA
Filed Dec. 20, 1928　　　7 Sheets-Sheet 1
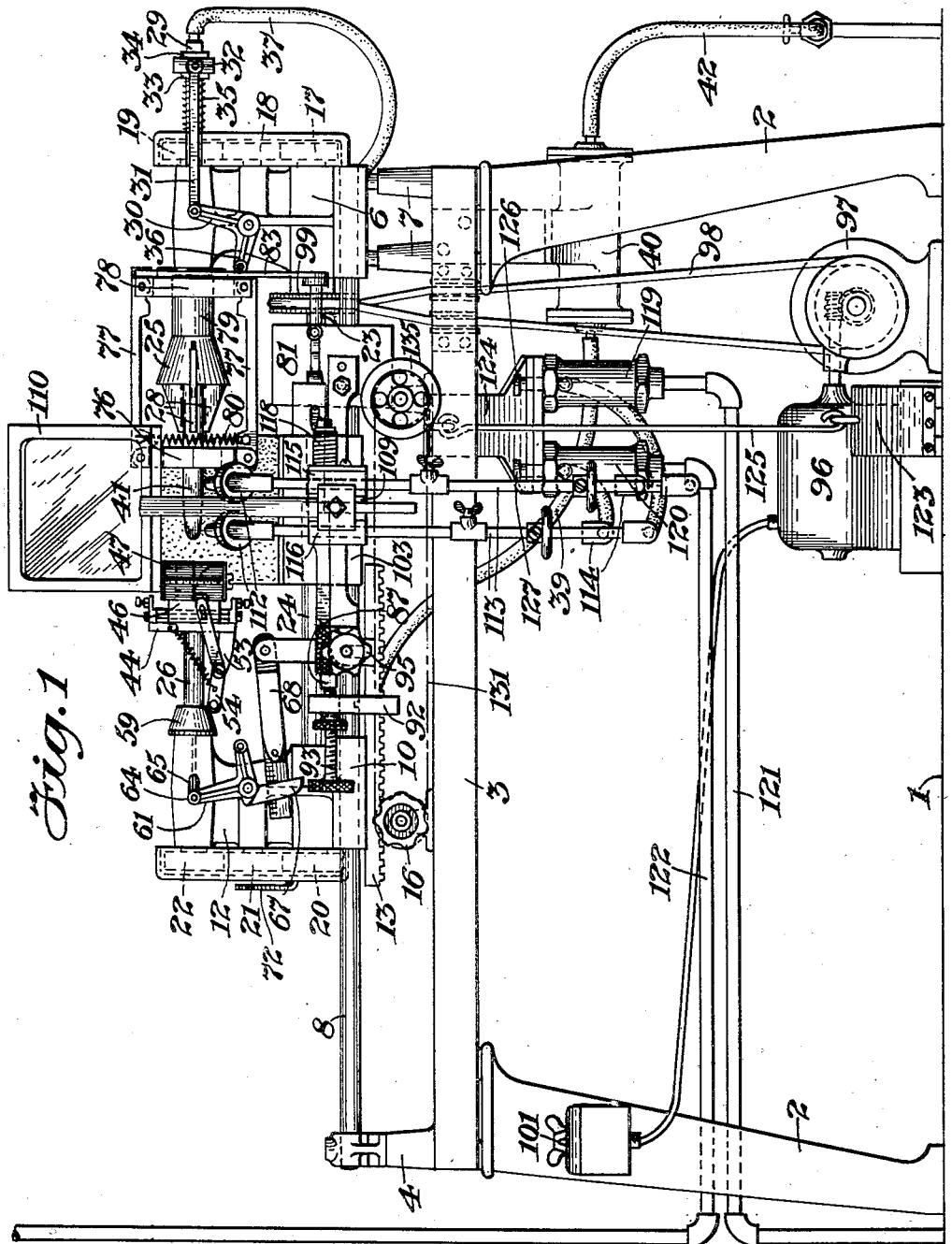
INVENTOR
George A. Millar
BY
Thos. H. Brown
HIS ATTORNEY

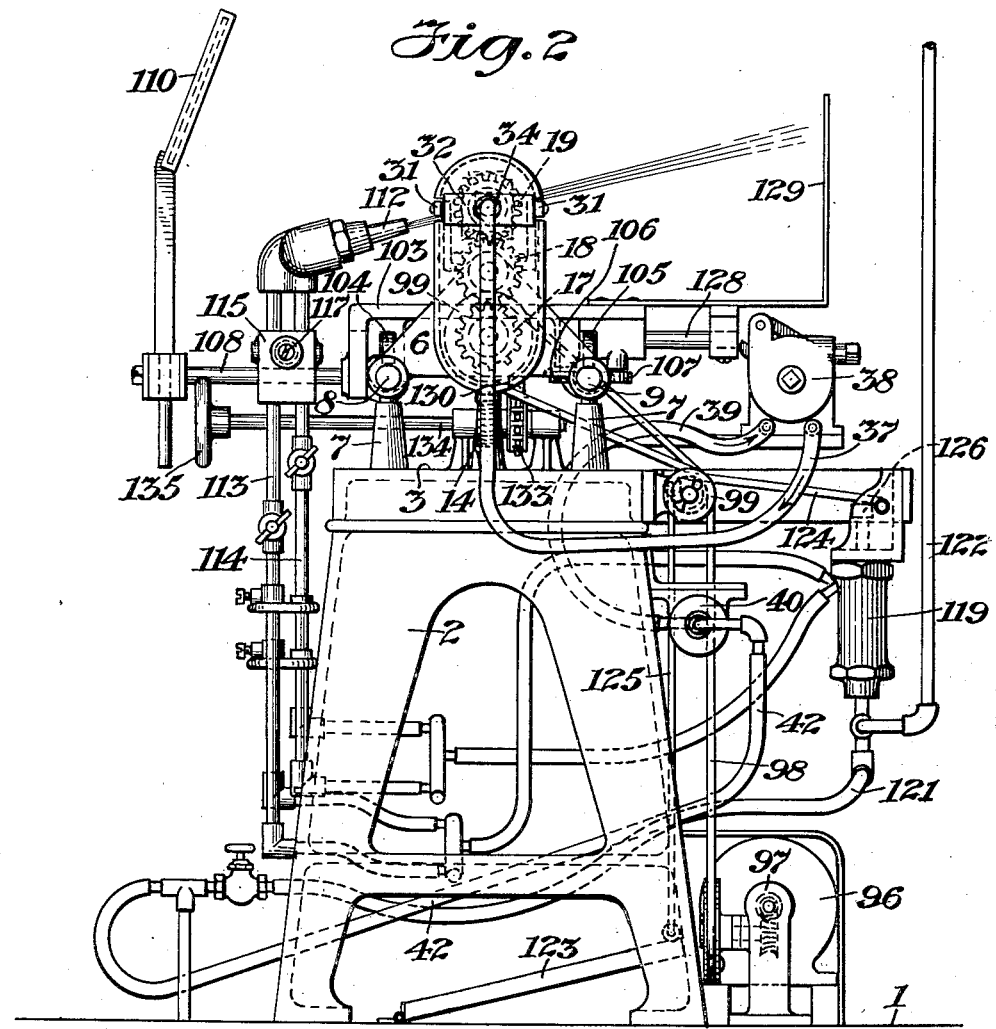
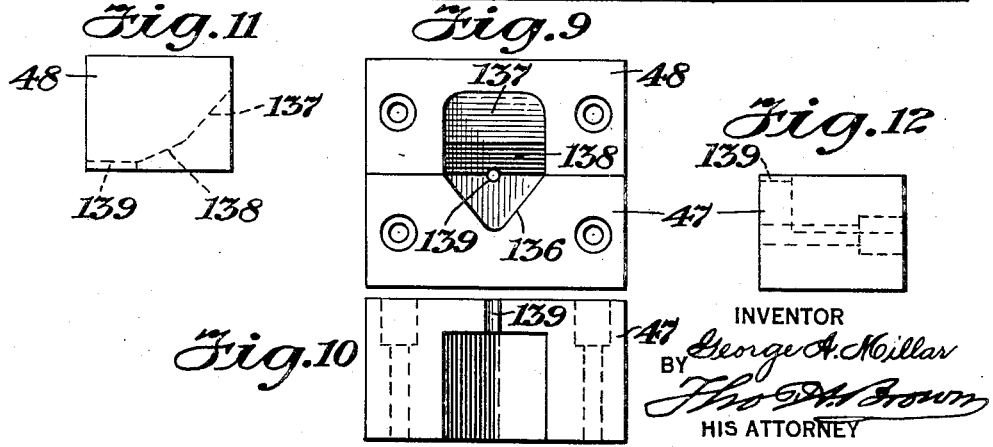

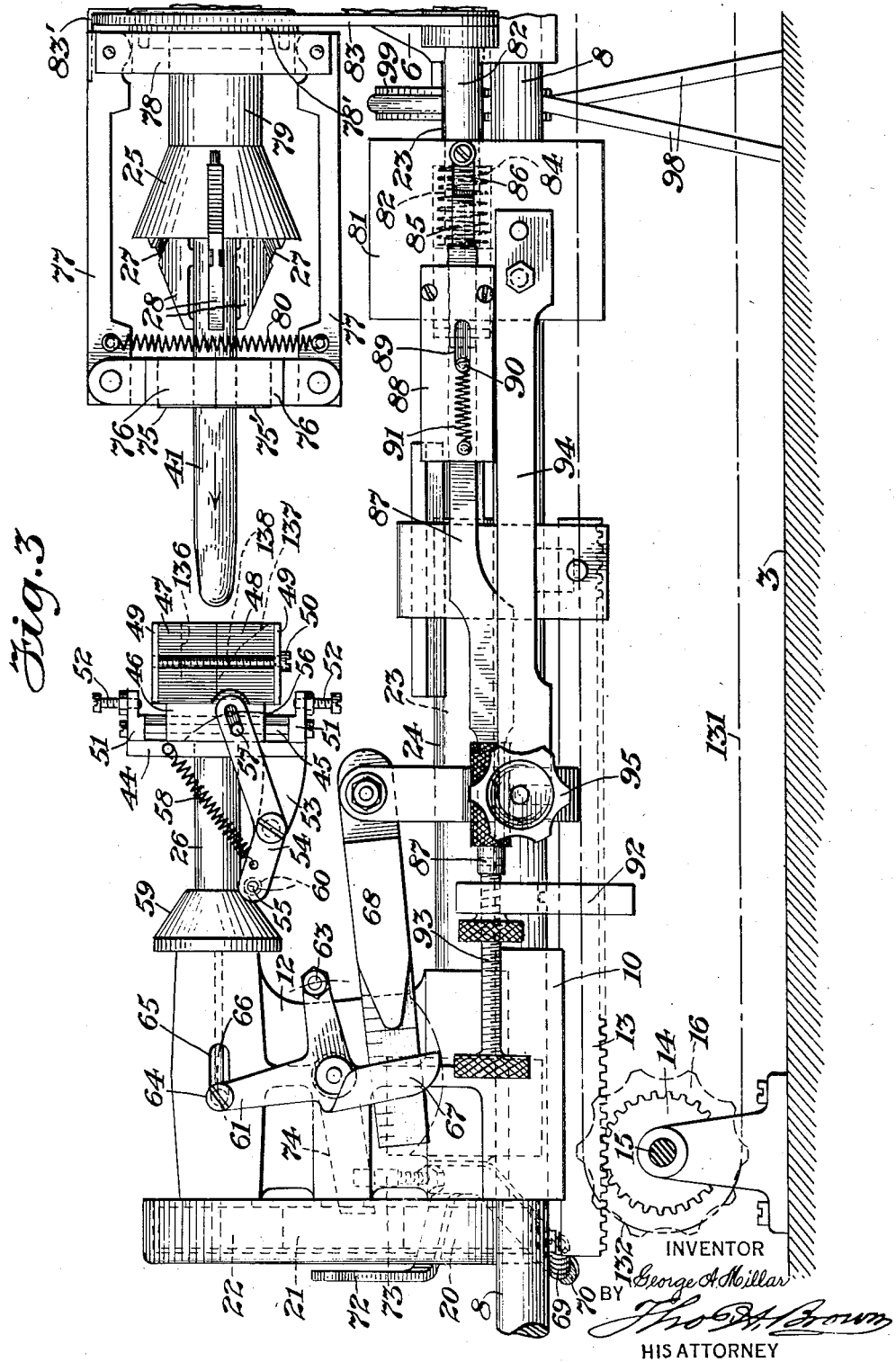

Feb. 14, 1933.  G. A. MILLAR  1,897,487
METHOD AND APPARATUS FOR WORKING FUSED SILICA
Filed Dec. 20, 1928  7 Sheets-Sheet 4
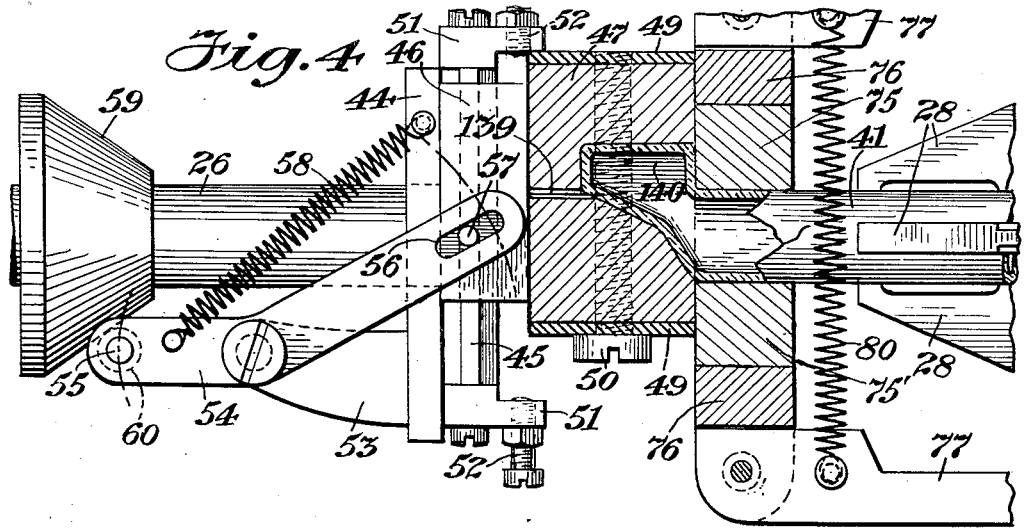
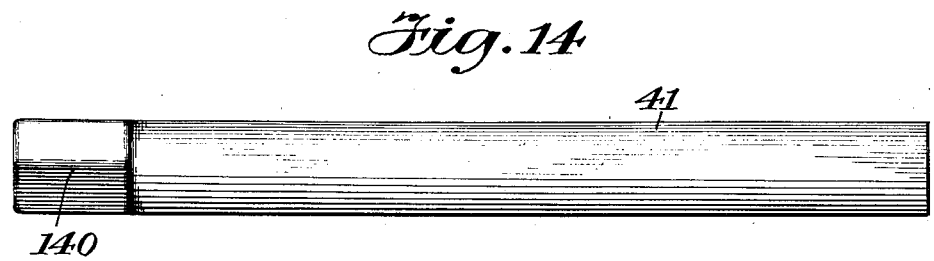
INVENTOR
George A. Millar
BY
HIS ATTORNEY Feb. 14, 1933.  G. A. MILLAR  1,897,487
METHOD AND APPARATUS FOR WORKING FUSED SILICA
Filed Dec. 20, 1928    7 Sheets-Sheet 5
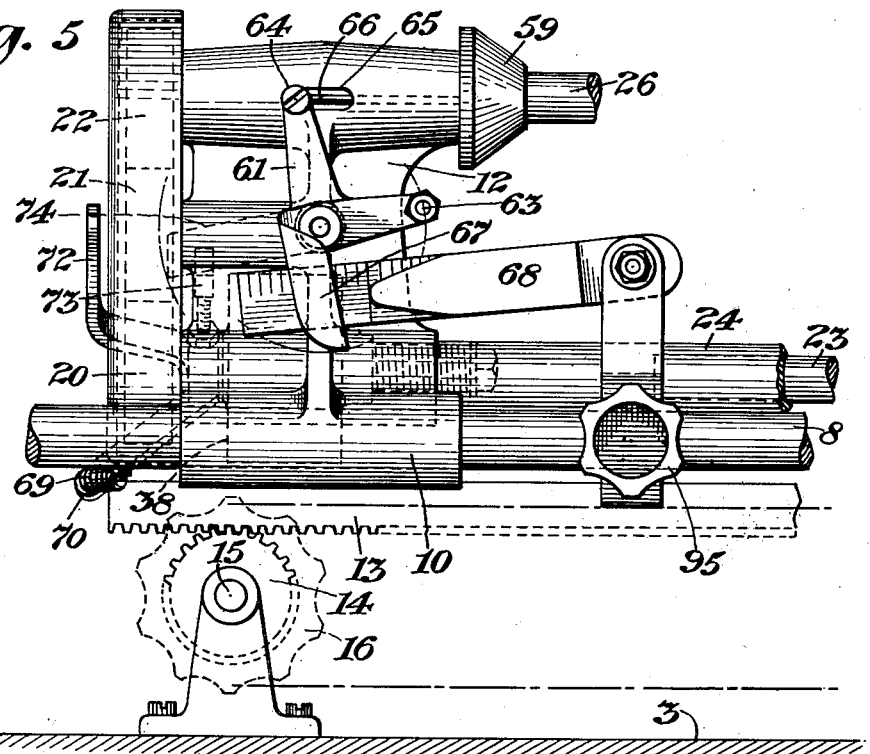
Fig. 5
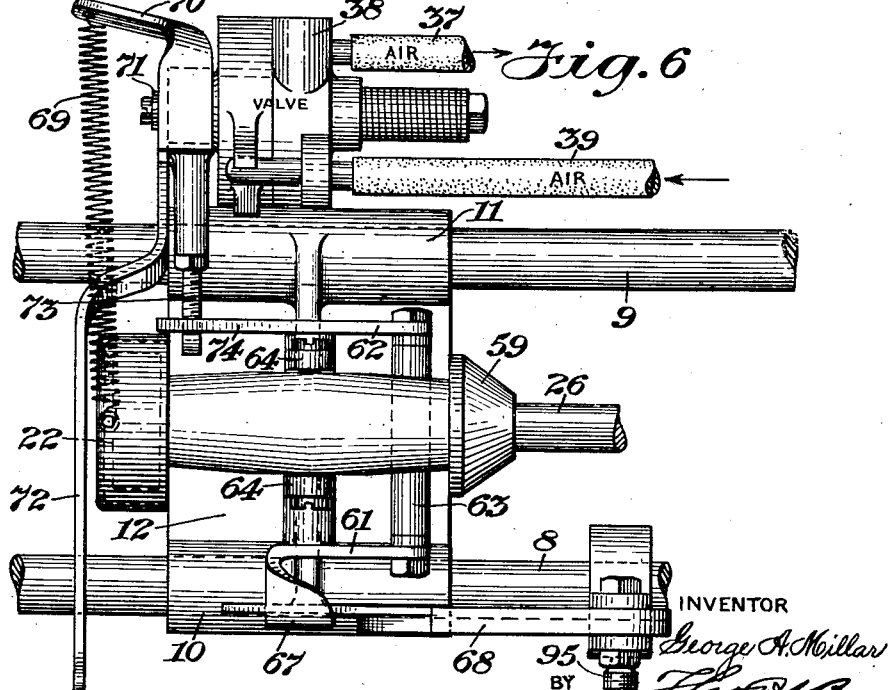
Fig. 6
INVENTOR
George A. Millar
BY 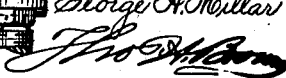
HIS ATTORNEY Feb. 14, 1933.                G. A. MILLAR                1,897,487
           METHOD AND APPARATUS FOR WORKING FUSED SILICA
                    Filed Dec. 20, 1928         7 Sheets-Sheet 6

*Fig. 7*

INVENTOR
George A. Millar
BY
Thos. A. Brown
HIS ATTORNEY

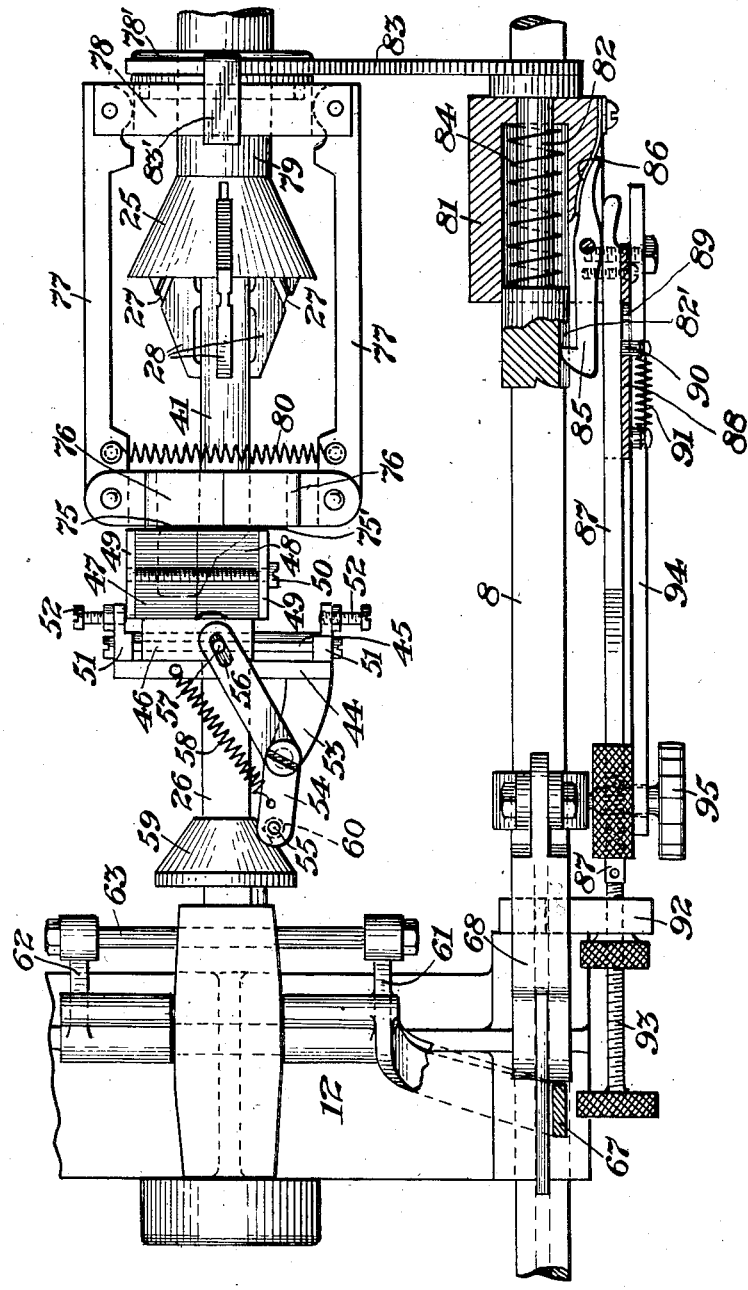

Patented Feb. 14, 1933

1,897,487

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

METHOD AND APPARATUS FOR WORKING FUSED SILICA

Application filed December 20, 1928. Serial No. 327,299.

The present invention relates to method of and apparatus for working fused silica or quartz.

The particular object of this invention is to provide a method and apparatus for blowing fused silica into a mold, and, when desired, offsetting a portion of the softened fused silica from the main body thereof during the blowing operation. Other objects of the invention will appear from the appended specification and drawings. The invention comprises new steps and certain new and useful features of construction and combination of parts as hereinafter set forth and claimed.

Heretofore, and for more than a quarter of a century, articles of fused silica have been produced by hand-blown methods which of course, considering the fact that quartz is usually worked at a temperature of 2,000° C. and is the most difficultly workable vitreous material known and volatilizes away rapidly at the working temperatures, has made the production of quartz articles an expensive process, especially since the working by hand is slow and tedious and the loss of materials due to volatilization during the working operations has added materially to the cost of production of the material fused silica which is itself expensive to produce.

I have discovered that articles of fused silica may be produced rapidly by blowing the same into molds and that when my new method of production of such articles is utilized, the cost of production thereof is greatly reduced, the rate of production is greatly increased and the loss of fused silica by volatilization incidental to the softening thereof to working temperatures, is reduced to a minimum, as compared with the long drawn out hand blowing methods heretofore employed in the fabrication of articles of fused silica. By my new process and apparatus, fused silica forms may be made by workers of ordinary mechanical skill, instead of by workers of many years experience in glass and fused silica working, such as heretofore have been necessary in forming these articles by hand.

The method of blowing hollow quartz articles of my invention, therefore, has the advantages (1) that during the molding, the softened fused silica is exposed only to materials which have no deleterious effect on the softened silica and thus the completed article of my process is free of all impurities; (2) the mold members, I have discovered, can be of hard graphite or other material which will not adhere to the fused quartz; (3) that the rate of production of formed articles is vastly increased by virtue of my new method over the rate of production of similar articles by methods known at present to fused silica workers; and (4) the loss of silica in the softening operation is reduced to a minimum and thus a saving of this expensive material is effected in the production of articles therefrom.

In the accompanying drawings there is shown by way of illustration one form of apparatus for carrying out my invention, in which Fig. 1 is a front view of a machine for practicing my invention, Fig. 2 is an end view of the same machine, Fig. 3 is an enlarged front elevation of the machine, Fig. 4 is a front elevation, in part section, of the mold and associated mechanism, showing it in its offset position, Figs. 5, 6 and 7 are respectively front, plan and end views showing in particular the air release mechanism, Fig. 8 is a plan view in part section of the apparatus shown in Fig. 3 with the molds rotated through 90° in order to show them more clearly, and showing the relative position of the elements after all the trip mechanism has operated, Fig. 9 is a view showing the open face of the offset mold, Fig. 10 is a plan view of the lower half thereof, Fig. 11 is a side view of the upper half of said offset mold, Fig. 12 is a side view of the lower half thereof, and Figs. 13, 14 and 15 are front, top and bottom views of the product of my new method and new apparatus.

In the drawings two leg members 2 mounted on the floor 1 support a bed plate 3. Said bed plate carries pillars 4 and 5 at one end and block 6 mounted on pillars 7 at the other end. Two parallel rods 8, 9 are carried by pillars 4 and 5 respectively at one end and by block 6 at the other end. Slidably mounted on rods 8 and 9 by means of bosses 10 and 11 respectively is a block 12. A longitudinal rack 13 secured to the lower side of said block 12 cooperates with a pinion 14 secured to shaft 15, mounted on said bed plate 3, to secure longitudinal movement of said block 12. Said shaft 15 carries at its front end a handwheel 16 for the operation thereof.

Block 6 carries a train of gears 17, 18, 19 and block 12 carries a similar train of gears 20, 21, 22 on a line extending vertically between the rods 8 and 9. Gears 17 and 20 are connected together by means of an extensible shaft comprising shaft 23, secured to gear 17, and the hollow shaft 24, secured to gear 20, telescoped thereon, said shafts 23 and 24 being splined together so as to provide proper driving connection therebetween, and at the same time permitting longitudinal movement of the one with respect to the other. Gear 19 carries a chuck sleeve 25, and gear 22 carries a shaft 26 which are axially aligned and extend toward each other. Said chuck is of the positively actuated type in which grooves 27 in the jaws 28 of the chuck engage with slots (not shown) in the tapered sleeve 25, whereby they are moved toward or away from each other as a central hollow spindle 29 which engages said jaws is moved longitudinally. Bell cranks 30, pivotally mounted on said block 6, are connected by links 31 to transverse bar 32, through which passes the spindle 29. Collars 33 and 34, fastened to spindle 29 on either side of transverse bar 32, provide a means of engagement between said members 29 and 32. A compression spring 35 mounted on spindle 29 with one end bearing against gear 19 and the other against collar 33 serves to keep chuck jaws 28 in a closed position except when handle 36 on bell crank 30 is actuated to move said chuck jaws 28 to the open position against the bias of said spring 35. At its outer end said hollow spindle 29 makes a swivel connection with hose 37, the other end of which is connected to air valve 38, which is carried by block 12 at the rear of boss 11. Air is supplied to said valve 38 from a suitable source by means of hose 39, through an air strainer 40 and tube 42. The operation of said valve 38 will be detailed later on. An annular stopper (not shown) of fiber or other suitable material is located within chuck sleeve 25 at the end of hollow spindle 29, and serves to make the connection between the fused silica tube 41 and said hollow spindle 29 substantially air tight.

Attached to the inner end of shaft 26 is a block 44 having a slideway 45 on each side thereof. Slidable on said slideway 45 is the block 46, to which are attached the two cooperating dissimilar graphite molds 47 and 48. The parts 47 and 48 are confined between plates 49, by means of screws 50. At each end of said slideway 45 is mounted a projecting plate 51 carrying a set screw 52, said set screws forming stops for said block 46. Plates 49, and molds 47 and 48 are so notched as not to engage said plates 51. At one end block 44 carries arms 53, to which are pivoted the levers 54. Said levers are connected by the rod 55 at one end, and at the other have slots 56 which engage pins 57 on block 46. Tension springs 58, connected to levers 54 at one end and block 44 at the other tend to keep block 46 at one end of slideway 45. Collar 59, having the shape of a conical frustum, and loosely mounted on shaft 26 engages a roller 60 on rod 55, so as to move block 46 toward the other end of slideway 45, when collar 59 is moved inwardly along shaft 26. Bell cranks 61, 62 pivotally mounted upon block 12, have two similar arms connected by rod 63, while the other arms each carry a stud 64. Said studs 64 project into the slots 65 and engage pins 66. Said pins 66 at their other ends bear upon collar 59. Attached to bell crank 61 is a lever arm 67 which is adapted to engage stop 68 adjustably mounted on rod 8 as block 12 is moved along rods 8 and 9. Said lever 67 also serves as a handle for manual operation of bell cranks 61, 62.

Air valve 38 is biased to the open position by spring 69, attached at one end to block 12 and at the other to lever 70 carried by the actuating shaft 71 of valve 38. Said valve can be closed by handle lever 72 also carried by shaft 71, and latching mechanism for keeping it in a closed position is supplied in the form of an adjustable rod 73 with a latch on the end thereof which is engaged by lever 74, attached to one arm of the bell crank 62, when bell cranks 61, 62 are in the position shown in Figs. 5 and 6, but released after said bell cranks have been actuated by the action of stop 68 on lever arm 67, as shown in dotted lines in Fig. 7.

A collar mold, of graphite or similar material, composed of the two similar parts 75, 75' is arranged to cooperate with mold 47, 48. Said parts 75, 75' together have a cylindrical opening of the size of the fused silica tube 41, and through which said tube is inserted when the machine is in operation. The molds 75, 75' are each encased in a U-shaped iron block 76, each of said blocks 76 being connected with a restricted pivotal movement to bars 77, which in turn are supported with restricted pivotal movement by collar 78 which is free to slide along the cylindrical shank 79 of chuck 25. Springs 80 connected between the bars 77 serve to keep the two halves of the mold together. Slidably mounted on rod 8, and keyed thereto so that it will not turn is a block 81, through which passes a rod 82. At one end said rod 82 carries a bar or plate 83 which engages with collar 78', which is mounted adjacent to collar 78 on shank 79, in such fashion that it can push said collar 78 toward the opposite end of the machine. A projection 83' on bar or plate 83 engages one of the bars 77 and prevents rotation of the mold 75, 75'. A spring 84 within said block 81 is sufficiently strong to drive said rod 82, bar 83, collars 78, 78' (and hence mold 75, 75') along shank 79 whenever trip 85, which holds said rod 82 at its opposite end of travel, is released. Said trip member 85 also serves to prevent rotation of the rod 82 by its engagement in the longitudinal slot 82' in rod 82. The trip 85, which is held normally against tripping by spring 86, is actuated to free said rod 82 by the beveled end of bar or rod 87, when said bar or rod 87 is moved longitudinally in its guides in plate 88, carried by block 81. Said plate 88 has a slot 89 therein, in which moves pin 90 attached to bar 87. A spring 91 connected to pin 90 at one end and to plate 88 at the other end biases said rod 87 to a non-tripping position. Block 92, slidably keyed to rod 8 and adapted to be moved along rod 8 by boss 10 when block 12 is moved along rods 8 and 9 to the right, carries a set screw 93 which is adapted to engage the rod 87 at a predetermined position, and thereby actuate trip 85. A bar 94 fastened to block 81 at one end and carried by the shaft of clamping screw 95 at the other end serves to correlate the actuation of bell cranks 61, 62 and rod or bar 87, regardless of the adjustment of stop 68.

A motor 96 supplies power through reduction gear 97 and belt 98 to pulley 99 mounted on shaft 23. A switch 101 is provided for starting and stopping the motor 96.

Carriage 103 is slidably mounted on rods 8 and 9, being supported thereon by roller 104 and rollers 105 and guided along said rods by rollers 106 and rollers 107. From the front of said carriage 103 extends a rod 108 which carries a small block 109 at an intermediate point and near the front end supports an eye shield 110. Burners 112, directed toward the fused silica tube 41, are fed by gas and oxygen through pipes 113 and pipes 114, respectively. The pipes 113, 114 for one burner 112 pass through a block 115 and the pipes 113, 114 for the other burner 112 pass through a block 116, said blocks 115 and 116 being supported by pivot 117 on opposite sides of said block 109 and held in frictional engagement therewith by spring 118, whereby the burners 112 may be oscillated in a vertical plane by the operator, using the pipes as a handle, but will remain in whatever position left. Said pipes 113, and said pipes 114, are connected respectively to the cylinders 119 and 120 of a mixing valve, gas and oxygen being supplied to said cylinders from convenient sources through pipes 121 and 122 respectively. Said valve normally cuts off all but a slight flow of gas and oxygen, but when pedal 123, hinged to floor 1 at one end, is depressed, lever 124 is pulled down by the connecting rod 125, thereby simultaneously depressing plungers 126 and 127 and permitting a larger flow, in proper proportions, of gas and oxygen. From the back of said carriage 103 extends a rod 128 which carries a baffle 129 of asbestos or similar material for the protection of passersby. Depending from the under side of said carriage 103 is a projection 130 to which is attached an endless chain 131. Said chain passes over sprocket 132, loosely mounted behind pinion 14 on shaft 15 at one end and over sprocket 133 secured to shaft 134 at the other end. Said shaft 134 is mounted on bed plate 3 and carries handwheel 135 at its front end.

The mold members 47 and 48 are shaped as in Figs. 9 and 12 where the invention is applied to making the throats of fused silica tubes for mercury arcs. The mold 47 has an opening 136 therein, substantially of the shape of an isosceles triangular prism. The mold 48 has an opening of similar area on the co-operating surface but having the two sloping surfaces 137 and 138 for a bottom. A passage 139 is provided between said molds 47 and 48 for the escape of any air trapped between the quartz and the walls of the mold.

In the use and operation of the above described machine, embodying the invention for blowing fused silica into a mold, in which some of the fused silica is to be considerably offset from the main body, the machine being running, switch 101 is opened, whereby the rotation of chuck 25, and of mold 47, 48 is arrested and the open end of a closed tube 41 of fused silica is inserted through collar mold 75, 75' into chuck 25, which is opened for the purpose by means of handle 36. The rotation of the tube 41 and the mold 47, 48 is then started by closing switch 101. The collar 78 is then moved to the right, carrying collar 78', bar or plate 83 and rod 82 with it, until the end of said bar 82 is engaged and held by trip 85. Handle lever 72 is also depressed to close air valve 38, and latched in that position by operation of handle lever 67. Collar 59 is then moved to its left limit of travel and mold 47, 48 restored to normal position by action of springs 58. Stop 68 is adjusted so as to allow the desired insertion of tube 41 within mold 47, 48 before actuation of the tripping devices. The flame from burners 112 is then increased by depressing pedal 123 and adjusted vertically by rotation on pivot 117 and longitudinally by means of handwheel 135 so as to play on the closed end of the fused silica tube 41. When the fused silica has become semi-fluid the flame is cut off by releasing pedal 123, and mold 47, 48 which in its normal position has the deepest part thereof axially aligned with the fused silica tube 41, is instantly moved toward said fused silica tube by means of handwheel 16. As the end of said fused silica tube 41 approaches the inner end of opening 136 in mold 47, 48 the stop 68 engages lever 67 and thereby simultaneously allows the opening of air valve 38 thus raising the pressure within tube 41, forcing the fused silica into contact with the walls of said mold, and forces collar 59 to the right, whereby the mold 47, 48 is offset from its axial position. At about the same time boss 10 engages block 92 and forces set screw 93 against the end of bar 87, whereby trip 85 is actuated and causes mold 75, 75' to be driven against mold 47, 48 and to co-operate therewith. As a result of these operations the offset portion 140 is formed on the fused silica tube 41. As soon as the fused silica has cooled sufficiently to hold its form the rotation of chuck 25 and mold 47, 48 is arrested by opening switch 101, and chuck 25 opened by means of handle 36, and mold 47, 48 moved to the left by means of handwheel 16, so that the finished product may be withdrawn from collar mold 75, 75' after which the cycle is again gone through with a new closed fused silica tube 41.

The time occupied in carrying out the foregoing operations is exceedingly short and the bringing of the fused silica to the critical softening temperature at which it can be blown in the mold takes up the major portion of the time. The instant the fused silica has attained the critical softening temperature, the described operations of the machine all take place rapidly and practically simultaneously and while the quartz is at that temperature. After the instantaneous blowing of the glass in the mold, the fire being shut off, the fused silica sets immediately and the molded article is withdrawn from the mold, whereupon the series of operations is repeated on another tube to be molded to a desired configuration. Thus by availing of the quick blowing and setting of fused silica while at the critical softening temperature I am enabled by my new process to produce blown quartz articles with great rapidity and with unskilled labor and am able to produce by my new process articles of better quality and finish than can be produced by expert fused silica hand workers and at an expenditure of minutes and by a single heat with my process as compared with hours for similar results by hand workers using the many or long continuous heats of old methods, with a consequent saving of time, labor, and materials.

It is to be understood that molds of other shapes and materials than the one illustrated and described could be utilized, and that the form of machine herein illustrated could be departed from, without departing from the spirit of the invention.

I claim:

1. The method of forming hollow vessels having offset portions of fused silica which comprises heating a portion of a closed tube of fused silica until softened, inserting the softened portion of the tube in a suitable mold and simultaneously therewith increasing the air pressure within said tube to force the said softened portion of said tube into contact with the wall of said mold, and offsetting said mold from the axis of said tube.

2. In a machine for working fused silica, in combination, a rotatable work holding means and a rotatable mold axially aligned therewith, means for synchronously rotating said holding means and said mold, means for softening a portion of a hollow fused silica body held by said work holding means, means for inserting the softened portion of said fused silica body in said mold, and means for increasing the air pressure in said hollow body.

3. In a machine for working fused silica, in combination, a work holding means, a mold in axial alignment therewith, means for uniformly softening a portion of a hollow fused silica body held by said work holding means, means for inserting the softened portion of said fused silica body in said mold, means for offsetting said mold from said axial alignment, and means for increasing the air pressure in said hollow body.

4. In a machine for working fused silica, in combination, a work holding means, a mold in axial alignment therewith, means for uniformly softening a portion of a hollow fused silica body held by said work holding means, means for inserting the softened portion of said fused silica body in said mold, means operative upon insertion of said body in said mold to offset said mold from said axial alignment, and means for increasing the air pressure within said hollow body.

5. In a machine for working fused silica, in combination, a work holding means, a mold in axial alignment therewith, means for uniformly softening a portion of a hollow fused silica body held by said work holding means, means for inserting the softened portion of said fused silica body in said mold, and means operative upon insertion of said body in said mold to offset said mold from said axial alignment and to increase the air pressure within said hollow body.

6. In a machine for working fused silica, in combination, a work holding means, a mold axially aligned therewith, means for synchronously rotating said work holding means and said mold, means for softening a portion of a hollow fused silica body held by said work holding means, means for inserting the softened portion of said fused silica body in said mold, means for off-setting said mold from said axial alignment and means for increasing the air pressure within said body.

7. In a machine for working fused silica, in combination, a work holding means, a mold axially aligned therewith, means for uniformly softening a portion of a hollow fused silica body held by said work holding means, means for inserting the softened portion of said fused silica body in said mold, a second mold between and axially aligned with said work holding means and first said mold and movable into cooperative relation with first said mold, means for offsetting first said mold from said axial alignment and means for increasing the air pressure within said hollow body.

8. In a machine for working fused silica, in combination, a work holding means, a mold axially aligned therewith, means for uniformly softening a portion of a hollow fused silica body held by said work holding means, means for inserting the softened portion of said fused silica body in said mold, a second mold axially aligned with and slidably supported between said work holding means and first said mold, and means operative upon insertion of said fused silica body in first said mold to offset first said mold from said axial alignment, to move second said mold into cooperative relation with first said mold, and to increase the air pressure within said body.

9. In a machine for working fused silica, in combination, a work holding means, a mold axially aligned therewith, means for synchronously rotating said work holding means and said mold, means for softening a portion of a hollow fused silica body held by said work holding means, means for inserting the softened portion of said fused silica body in said mold, a second mold between and axially aligned with said work holding means and first said mold and movable into cooperative relation with first said mold, means for offsetting first said mold from said axial alignment and means for increasing the air pressure within said body.

10. In a machine for working fused silica, in combination, a rotatable work holding means and a rotatable enclosing mold axially aligned therewith, means for synchronously rotating said holding means and said mold, means for softening a portion of a hollow fused silica body held by said work holding means, means for inserting the softened portion of said fused silica body in said enclosing mold, and means for increasing the air pressure in said hollow body.

11. In a machine for working fused silica, in combination a work holding means, an enclosing mold, means for uniformly softening a portion of a hollow fused silica body held by said work holding means, means for inserting the softened portion of said fused silica body in said enclosing mold, and means operative upon insertion of said body in said mold to automatically increase the air pressure within said hollow body.

12. The method of forming hollow vessels of fused silica which comprises connecting the open end of a fused silica tube having a closed end with an air supply system, synchronously rotating said tube and a mold in axial alignment therewith, applying heat to a portion of said rotating tube to render it plastic, inserting said plastic portion in said mold and instantly admitting air to said tube from said air supply system to flow said plastic portion into contact with the wall of said mold.

Signed at Hoboken in the county of Hudson and State of New Jersey this 18th day of December A. D. 1928.

GEORGE A. MILLAR.